Feb. 12, 1935. H. C. LORD 1,991,254
SHACKLE JOINT
Filed March 28, 1929

INVENTOR.
Hugh C. Lord

Patented Feb. 12, 1935

1,991,254

UNITED STATES PATENT OFFICE 1,991,254

SHACKLE JOINT

Hugh C. Lord, Erie, Pa.

Application March 28, 1929, Serial No. 350,699

13 Claims. (Cl. 267—54)

The present invention is particularly designed for shackle joints in which there is a variation of turning movement as in a spring suspension for an automobile and particularly with relation to rubber joints for such suspension. Rubber joints taking up the turning movement through the distortion of the rubber have limitations as to the extent of movement and also the wear on the rubber due to the distortion is very much increased as the distortion is increased. I have found that in the compression type of shackle joint the turning movement of the spring eye is very much more than that of the turning movement of the joint in the bracket. In ordinary installations it is approximately double. It is, therefore, desirable to make the rubber joint of the spring eye of greater flexibility, or capacity for turning than the joint in the bracket and in giving it this greater flexibility it gives to the joint as against side-sway less rigidity. As a result, therefore, in some types of shackle joints it has been desirable, in fact almost necessary, to supply a cross brace member between the shackles to prevent the sidesway of the shackles in the joints.

In carrying out my invention I use what might be termed a single joint in the bracket with a pin for its central member extending beyond the joint proper and secure the shackles rigidly to this extending pin. Thus there is formed a rigid metallic U for the shackle which assures rigidity as between the opposing shackle links. This leaves the structure free to provide a more flexible rubber joint for the spring eye without losing the rigidity of the shackle structure as a whole. Another feature of the invention is the forming of the shackle links in halves, clamping these halves together to secure them on the joints. With the links thus formed it is possible to readily machine them, or to form the parts by coining, if desired. Features and details of the invention will appear from the specification and claims.

A preferred embodiment of the invention is illustrated in the accompanying drawing as follows:—

Figure 1:
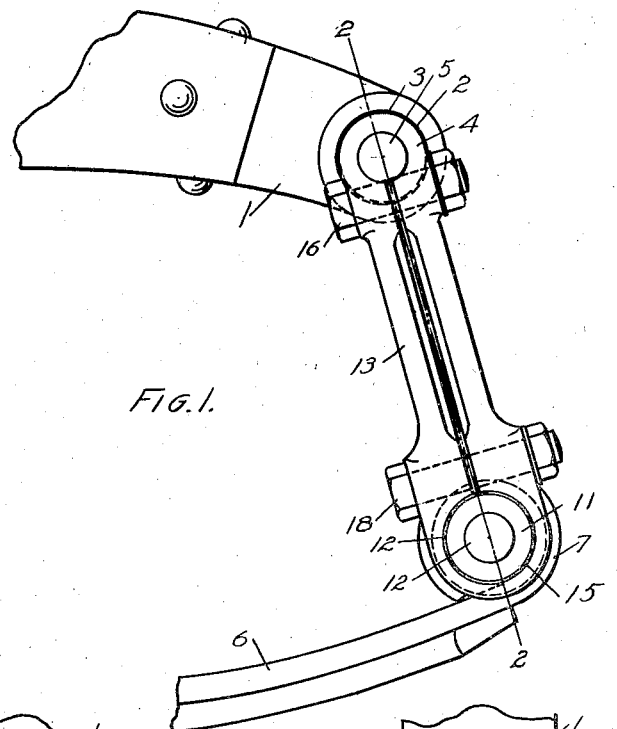

Fig. 1 shows a side elevation of the shackle structure.

Figure 2:
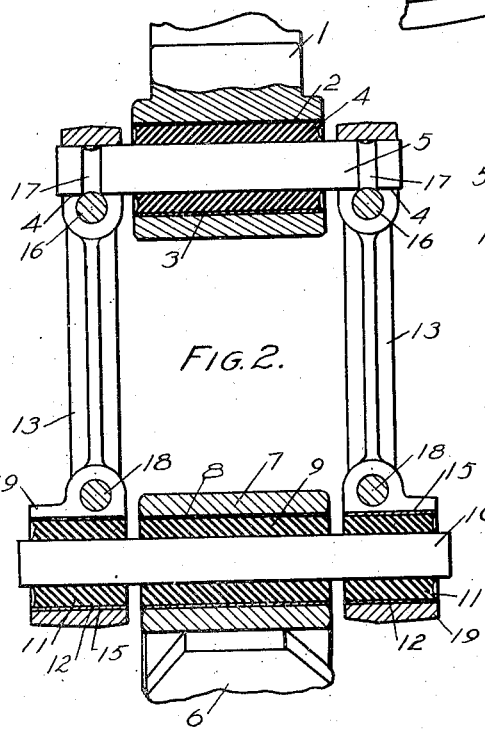

Fig. 2 a section on the line 2—2 in Fig. 1.

Figure 3:
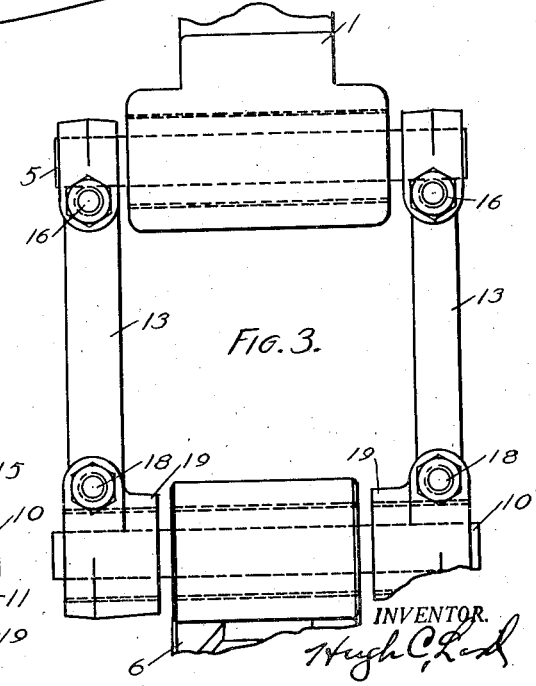

Fig. 3 an end view of a modification.

1 marks the frame bracket. This has a joint opening 2 and arranged in this joint opening is a joint comprising an outer shell 3 pressed into the opening 2, a rubber bushing 4, and a central pin 5, the rubber being preferably secured to the pin and shell by surface bonding.

A spring 6 has a spring eye 7 in which there is a joint spool having an outer shell 8, a rubber bushing 9, and a central pin 10. The central pin 10 is elongated and rubber bushings 11 are arranged on the ends of the pin 10 and shells 12 are arranged on the bushings 11. The rubber bushings 9 and 11 are preferably secured to the pin and shells by surface bonding.

Shackle links 13 are formed in halves, each half having grooves 14 for receiving the pin 5 and grooves 15 for receiving the shells 12. Clamping bolts 16 extend through the upper ends of the links. These bolts extend into grooves 17 in extensions of the pin 5. Thus the bolts 16 not only clamp the links on the pin but also key, or lock the pin against possible end movement through the engagement of the bolts with the walls of the grooves 17.

Clamping bolts 18 extend through the lower ends of the links, clamping the lower ends of the links on the shells 12. It will be observed that the lower ends of the links are off-set from the center with extending sleeves 19. This permits of having the upper ends of the links as close to the bracket as practical and at the same time entirely supporting the shell of the lower joints. If desired, the links may be reversed so far as the extension 19 is concerned and in this case the upper joint may be made longer, thus interposing a longer rubber bushing in this joint and giving greater rigidity to the shackle joints as a whole as against any cocking strain.

It will be observed that with the structure, the pin 5 being rigid with the links 13 forms a rigid metallic U structure for the shackle as a whole and it is, therefore, unnecessary to provide a separate bracing means between the links. The single joint at the top also has less flexibility as against cocking, or angling movement than a double joint such as is shown in the spring eye, or a joint having sufficient flexibility to take the larger movement of the spring eye. It will be noted that the joint in the spring eye is subjected to the same turning movement as that in the bracket so far as the swinging of the links themselves is concerned. In addition to the turning movement incident to the swinging of the links the joint in the spring eye also sustains the turning movement incident to the down-swinging of the spring eye and in actual practice this is approximately as great a turning movement as the turning movement incident to the swinging of the link. By using, therefore, a double joint at the spring eye end, the rubber distortion to accommodate this double movement is approximately equal to the rubber distortion in the single joint in the bracket opening. By making the links in halves the grooves may be very much more readily formed by gang milling, or by coining.

What I claim as new is:—

1. In a shackle joint, the combination of two joint members, each having a joint opening therein, one of the members having a greater relative turning movement than the other; a rubber joint in the smaller movement member comprising a rubber bushing in the opening and a central pin, a rubber joint in the greater movement member comprising a rubber bushing in the opening; an elongated pin in the bushing; a rubber bushing on each end of the elongated pin; and shackle links rigidly attached to the central pin and the rubber bushings on the elongated pin.

2. In a shackle joint, the combination of a frame bracket having a joint opening therein; a spring having a spring eye thereon; a rubber joint in the bracket opening comprising a rubber bushing in the opening and a central pin; a rubber joint in the spring eye comprising a bushing in the spring eye; an elongated pin in the bushing; rubber bushings at the ends of the elongated pin; and shackles between the end bushings on the elongated pin and rigidly connected with the pin of the joint in the bracket.

3. In a shackle joint, the combination of two joint members, each having a joint opening therein, one of the members having a greater relative turning movement than the other; rubber joints in the smaller movement member comprising a rubber bushing in the opening and a central pin; a rubber joint in the greater movement member comprising a rubber bushing in the opening; an elongated pin in the bushing; a rubber bushing on each end of the elongated pin; and shackle links rigidly attached to the central pin and the rubber bushings on the elongated pin, said rubber bushings being locked to sustain through the distortion of the rubber the normal turning movement of the joints.

4. In a shackle joint, the combination of two joint members, each having a joint opening therein, one of the members having a greater relative turning movement than the other; rubber joints in the smaller movement member comprising a rubber bushing in the opening and a central pin; a rubber joint in the greater movement member comprising a rubber bushing in the opening; an elongated pin in the bushing; a rubber bushing on each end of the elongated pin; and shackle links rigidly attached to the central pin and the rubber bushings on the elongated pin, said rubber bushings being locked by surface bonding to sustain through the distortion of the rubber the normal turning movement of the joints.

5. In a shackle joint, the combination of a frame bracket having a joint opening therein; a spring having a spring eye thereon; a rubber joint in the bracket opening comprising a rubber bushing in the opening and a central pin; a rubber joint in the spring eye comprising a bushing in the spring eye; an elongated pin in the bushing; rubber bushings at the ends of the elongated pin; and shackles between the end bushings on the elongated pin and rigidly connected with the pin of the joint in the bracket, the rubber bushings in the bracket spring eye being locked with the walls thereof and the pin and the rubber bushings on the ends of the elongated pin being locked with the pin and the shackle to sustain through the distortion of the rubber the normal turning movement of the joints.

6. In a shackle joint, the combination of a frame bracket having a joint opening therein; a spring having a spring eye thereon; a rubber joint in the bracket opening comprising a rubber bushing in the opening and a central pin; a rubber joint in the spring eye comprising a bushing in the spring eye; an elongated pin in the bushing; rubber bushings at the ends of the elongated pin; and shackles between the end bushings on the elongated pin and rigidly connected with the pin of the joint in the bracket, the rubber bushings in the bracket spring eye being locked by surface bonding with the walls thereof and the pin and the rubber bushings on the ends of the elongated pin being locked by surface bonding with the pin and the shackle to sustain through the distortion of the rubber the normal turning movement of the joints.

7. In a shackle joint, the combination of two joint members, each having a joint opening therein, one of the members having a greater relative turning movement than the other; a rubber joint in the smaller movement member comprising a rubber bushing in the opening and a central pin; a rubber joint in the greater movement member comprising a rubber bushing in the opening; an elongated pin in the bushing; a rubber bushing on each end of the elongated pin; and shackle links rigidly attached to the central pin and the rubber bushings on the elongated pin, the rubber bushing of the smaller movement member being longer than the central bushing of the joint in the greater movement member.

8. In a shackle joint, the combination of two joint members; rubber joints in said members, each comprising a rubber bushing in the member and a central pin in the bushing, one of the pins having a locking groove therein; shackle links connecting said pins, each having two sides and each side having joint receiving grooves receiving said pins; and a clamping bolt securing the halves together, the clamping bolt engaging the walls of the grooved pin to lock the shackle on the pin.

9. In a shackle joint, the combination of two joint members having joint openings therein; a single joint in one opening comprising a bushing in the opening and a central extending pin in the bushing; a double joint in the other opening having a central bushing in the opening; an elongated pin in the central opening; rubber bushings on the ends of the elongated pin; and shackles engaging the ends of the extending pin and the end bushings.

10. In a shackle joint, the combination of two joint members having joint openings therein; a single joint in one opening comprising a bushing in the opening and a central extending pin in the bushing; a double joint in the other opening having a central bushing in the opening; an elongated pin in the central opening; rubber bushings on the ends of the elongated pin; and shackles engaging the ends of the extending pin and the end bushings, said shackles each having clamping walls engaging the walls of the bushing and pin, and clamping bolts closing the walls of the shackle on the bushings and pin, said shackles being spaced from the walls of the opening.

11. In a shackle joint, the combination of two joint members having joint openings therein; a single joint in one opening comprising a bushing in the opening and a central extending pin in the bushing; a double joint in the other opening having a central bushing in the opening; an elongated pin in the central opening; rubber bushings on the ends of the elongated pin; and shackles engaging the ends of the extending pin and the end bushings, said shackles having off-set sleeve extensions engaging the bushings.

12. In a shackle device the combination of two joint members one of which is flexible, shackles connecting said members having angular movement relative to said members, rubber joints between the shackles and the members, the rubber joints being locked with the shackles and the members and accommodating the movement of the joints through distortion of the rubber, the joint between the flexible member and the shackles having the greater angular movement, the rubber of the respective joints being so relatively disposed and arranged that in the operation of the device the rubber of the joint between the flexible member and the shackles will produce a less distortion of the rubber per unit of angular movement.

13. In a shackle device the combination of two joint members, shackles connecting said members having angular movement relative to said members, rubber joints between the shackles and the members, the rubber of the joints being locked with the shackles and the members and accommodating the movement of the joints through distortion of the rubber, one of said members being capable of greater angular movement relative to said shackles than the other of said members, the rubber of said joints being so relatively disposed and arranged that in the operation of the device to support a load, the rubber of the joint between the member having the greater angular movement and the shackles will produce a less distortion of the rubber per unit of angular movement.

HUGH C. LORD.